US006956715B2

(12) United States Patent
Mueller et al.

(10) Patent No.: US 6,956,715 B2
(45) Date of Patent: Oct. 18, 2005

(54) HIGH-DENSITY MEDIA STORAGE SYSTEM (75) Inventors: Robert L. Mueller, San Diego, CA (US); Paul C. Coffin, Battle Ground, WA (US); Gregg S. Schmidtke, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 10/389,833

(22) Filed: Mar. 17, 2003

(65) Prior Publication Data
US 2004/0184364 A1 Sep. 23, 2004

(51) Int. Cl.[7] .............................................. G11B 15/68
(52) U.S. Cl. ..................................... 360/92; 369/30.39
(58) Field of Search .............................. 360/92, 98.04, 360/98.06; 369/30.39, 30.63, 31.01, 30.43, 369/30.45, 178.01

(56) References Cited

U.S. PATENT DOCUMENTS

| 5,128,912 A |   | 7/1992  | Hug et al.       |          |
|-------------|---|---------|------------------|----------|
| 5,189,652 A | * | 2/1993  | Inoue            | 369/30.89 |
| 5,544,146 A |   | 8/1996  | Luffel et al.    |          |
| 5,596,556 A |   | 1/1997  | Luffel et al.    |          |
| 5,996,741 A |   | 12/1999 | Jones et al.     |          |
| 6,025,972 A | * | 2/2000  | Schmidtke et al. | 360/98.06 |
| 6,155,766 A |   | 12/2000 | Ostwald et al.   |          |
| 6,240,058 B1 | * | 5/2001  | Pitz et al.      | 369/30.39 |
| 6,327,113 B1 | * | 12/2001 | Mueller et al.   | 360/92 |
| 6,438,623 B1 | * | 8/2002  | Ryan             | 710/2 |
| 6,473,371 B1 |   | 10/2002 | White            |       |
| 6,515,822 B1 | * | 2/2003  | White et al.     | 360/92 |
| 6,621,655 B2 | * | 9/2003  | White et al.     | 360/92 |

FOREIGN PATENT DOCUMENTS

| EP | 0982723 | 3/2000 |
| EP | 1052637 | 11/2000 |

OTHER PUBLICATIONS

U.S. Appl. No. 10/202,731, filed Jul. 24, 2002 for invention entitled "Cartridge-Handling Apparatus" of Robert Wesley Luffel.

* cited by examiner

*Primary Examiner*—Allen Cao (57) ABSTRACT

A high-density media storage system. One embodiment of the high-density media storage system may comprises a plurality of storage libraries, each configured to store data cartridges in a horizontal orientation in high-density relation to one another. Such system also comprises a cartridge-handling apparatus having a drive assembly, the drive assembly moving the cartridge-handling apparatus through a displacement path through the plurality of storage libraries. The system further comprises an operational envelope provided at one end of the displacement path in one of the plurality of storage libraries, the operational envelope sized to receive only the drive assembly of the cartridge-handling apparatus when the cartridge-handling apparatus is positioned at the one end of the displacement path.

26 Claims, 7 Drawing Sheets

HIGH-DENSITY MEDIA STORAGE SYSTEM

FIELD OF THE INVENTION

The invention generally pertains to media storage systems and, more specifically, to high-density media storage systems.

BACKGROUND

Media storage systems are well-known in the art and are commonly used to store data cartridges at known locations and to retrieve desired data cartridges as needed so that data may be written to and/or read from the data cartridges. Such media storage systems are also often referred to as autochangers or library storage systems.

Modular media storage systems enable the user to expand the storage capacity of these systems. These media storage systems may include an individual storage library that can be used as a stand-alone unit, or combined with other storage libraries to increase the storage capacity of the media storage system, based on the user's storage requirements.

The data cartridges are typically stored in individual storage locations provided in each of the storage libraries. One or more cartridge-engaging assemblies or "pickers" may also be provided for engaging and transporting the various data cartridges stored therein. For example, the picker may retrieve one of the data cartridges from a storage location and transport it to a read/write device for read and/or write operations. Following the read/write operation, the picker returns the data cartridge to the storage location.

Each storage library is configured to accommodate a number of storage locations, read/write device(s), and various drive systems used to position the picker in the media storage system. A portion of each storage library is dedicated to various devices, such as drive systems for the picker, and therefore is not available for storing data cartridges. These portions of the storage library increase the size of the storage library but do not provide additional storage capacity, thereby reducing the storage density of the media storage system. When more than one storage library is used, the problem is compounded.

In addition, pass-through mechanisms may be required to exchange data cartridges between the different storage libraries. Pass-through mechanisms further sacrifice storage density, increase the cost of these systems, and introduce reliability issues.

Furthermore, data cartridges are often vertically oriented for storage in the media storage system. Accordingly, the read/write device(s) are also vertically oriented within the media storage system so that the data cartridges do not need to be reoriented when taken from the storage locations to the read/write device(s). However, such an orientation may also contribute to a reduced storage density of the media storage system.

SUMMARY OF THE INVENTION

An embodiment of a high-density media storage system comprises a plurality of storage libraries, each configured to store data cartridges in a horizontal orientation in high-density relation to one another. Such system also comprises a cartridge-handling apparatus having a drive assembly, the drive assembly moving the cartridge-handling apparatus through a displacement path through the plurality of storage libraries. The system further comprises an operational envelope provided at one end of the displacement path in one of the plurality of storage libraries, the operational envelope sized to receive only the drive assembly of the cartridge-handling apparatus when the cartridge-handling apparatus is positioned at the one end of the displacement path.

BRIEF DESCRIPTION OF THE DRAWINGS

Illustrative and presently preferred embodiments of the invention are illustrated in the drawings, in which.

DETAILED DESCRIPTION

Embodiments of a high-density media storage system 10 (FIG. 1) are shown and described herein according to the teachings of the invention. Briefly, media storage system 10 may comprise one or more storage libraries 20–23 (referred to hereinafter generally by reference number 20 unless identifying a specific storage library). Data cartridges 14 (FIG. 2) are stored in individual storage locations 16 in the storage libraries 20. Cartridge-handling apparatus 12 is used to transport the data cartridges 14 in the media storage system 10. For example, the data cartridges 14 may be delivered to a read/write device 18 for read and/or write operations and returned to the storage location 16 following the read/write operation.

Figure 1:
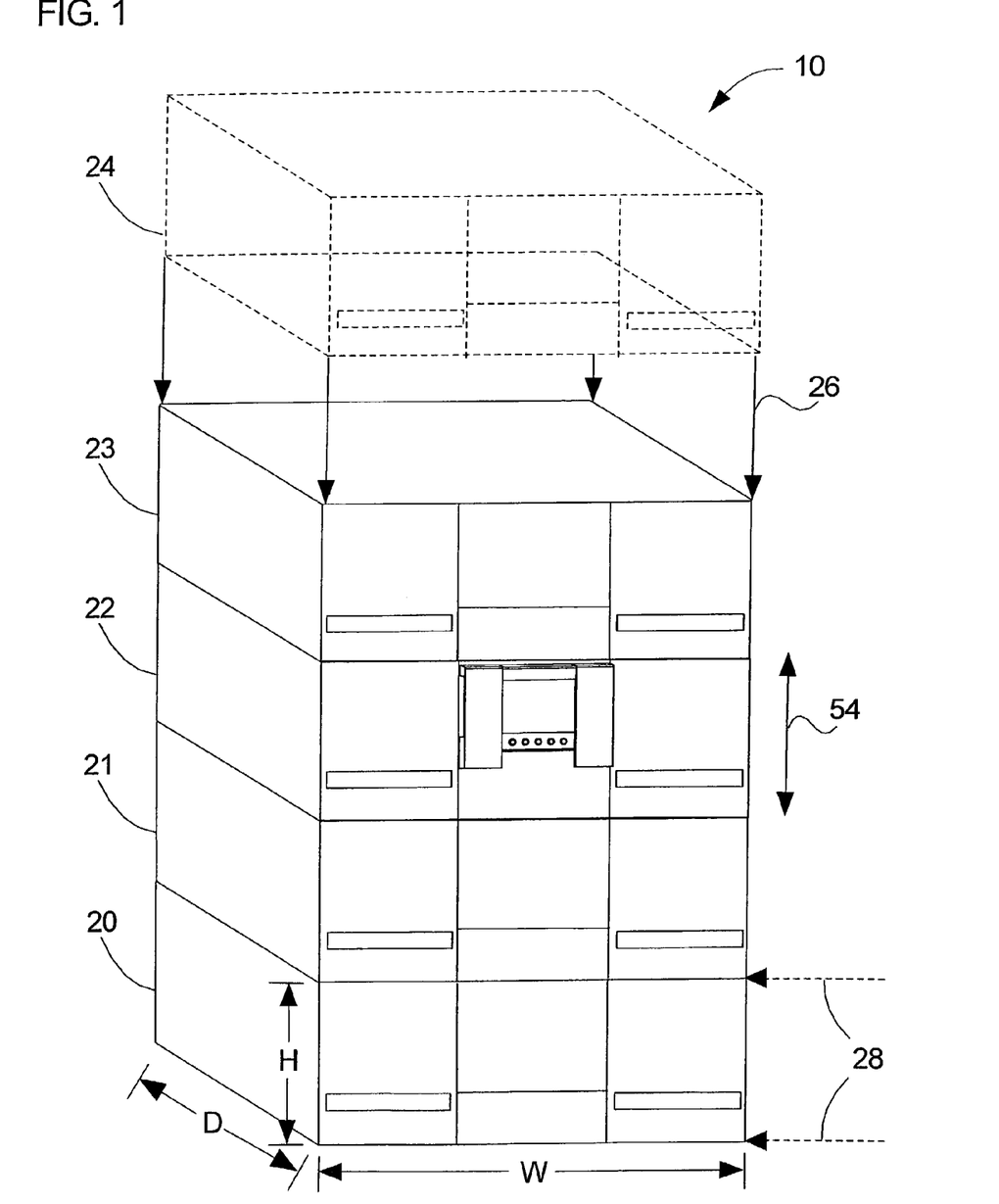
FIG. 1 is a perspective view of one embodiment of a high-density media storage system having a plurality of storage libraries.

More specifically, and again with reference to the embodiment shown in FIG. 1, high-density media storage system 10 may comprise a number of individual storage libraries 20 that are arranged adjacent one another. Additional storage libraries 20 may be added to the high-density media storage system 10 to provide storage capacity for more data cartridges 14. Alternatively, where fewer storage libraries 20 are needed, storage libraries 20 may be removed from the media storage system 10.

In one embodiment, storage libraries 20 are stacked one on top of the other, as shown in FIG. 1. Of course more storage libraries 20 may also be stacked together, as illustrated by storage library 24 and arrows 26. Other arrangements are also possible. For example, storage libraries 20 may be stacked next to one another (on either side, in front, or behind), as illustrated by arrows 28 in FIG. 1.

According to preferred embodiments of the invention, storage libraries 20 are sized according to Electronics Industry Association (EIA) standards. One EIA unit (or "U") is currently defined as having a height of 44.5 millimeters (mm) or 1.75 inches (in). Electronic equipment height is often specified in EIA units. For example, equipment having a height of 44.5 mm may be referred to as one EIA unit, or "1U". Likewise, equipment having a height of 89 mm may be referred to as two EIA units or "2U", and so forth. EIA also specifies that equipment conforming to EIA standards be no wider than 450 mm (17.72 in). In addition, EIA also defines uniform, aligned hole spacing for mounting the equipment to the rack systems. Equipment that is sized according to EIA standards may be readily mounted to standard EIA cabinets or rack systems.

In one embodiment, each storage library 20 has a height H (FIG. 1) of about 128 mm (e.g., about three EIA units), a width W of about 438 mm, and a depth D of about 711 mm. Accordingly, each storage library 20 is configured to fit within a standard EIA cabinet or rack system. In some embodiments, the high-density media storage system 10 may have up to fourteen storage libraries 20 having an overall height of 42U, the height of a standard EIA cabinet or rack system. Of course it is understood that the invention is so not limited.

Figure 2:
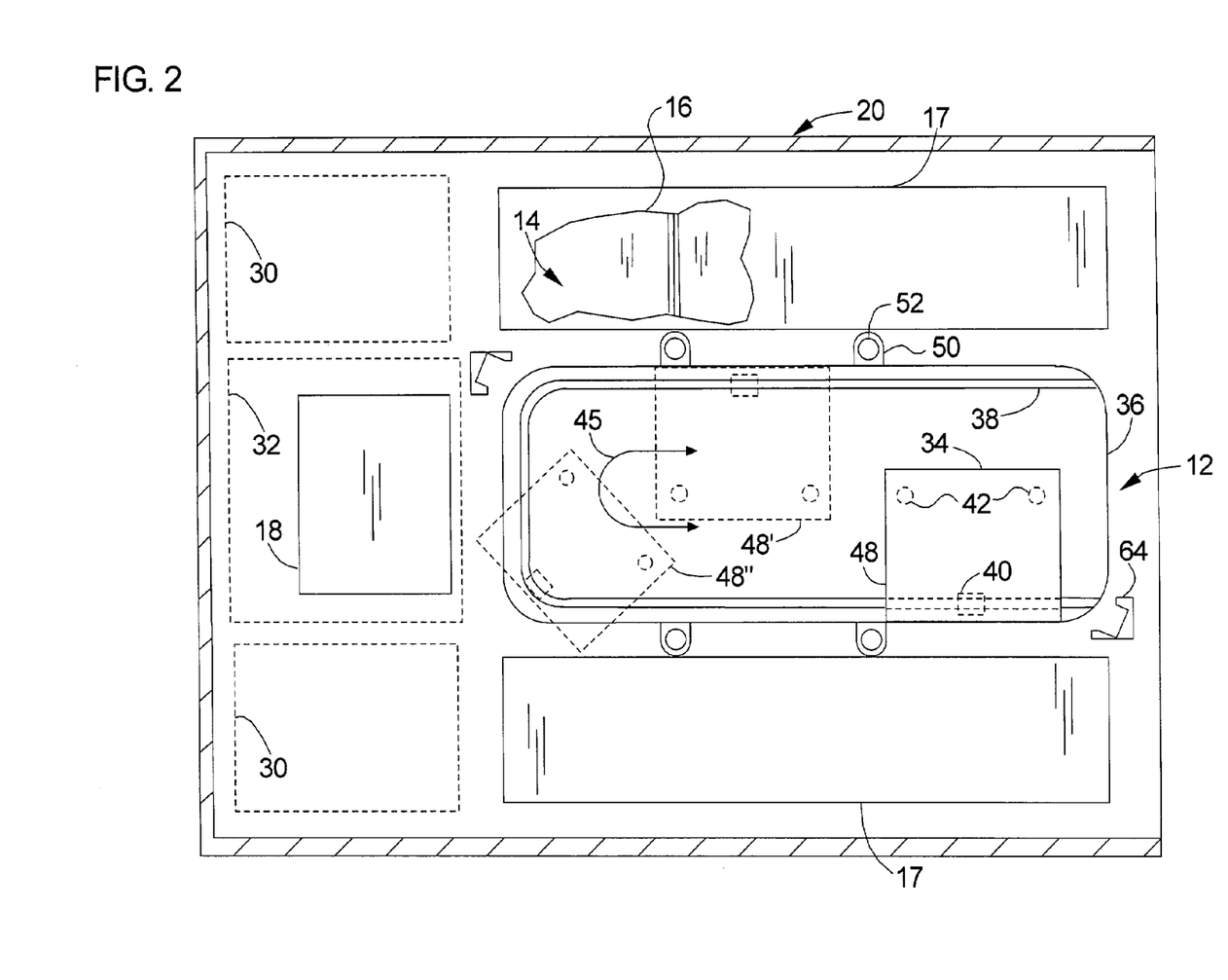
FIG. 2 is a plan view of one embodiment of one of the storage libraries of high-density media storage system.

In any event, storage libraries 20 may be provided with a number of storage locations 16 for data cartridges 14, as shown according to one embodiment in FIG. 2. According to this embodiment, storage magazines 17 may be provided for the convenience of the user. Storage magazines 17 can be readily added or removed, enabling the user to replace several data cartridges 14 in the storage library 20 at a time. In addition, the storage locations 16 are preferably configured to receive horizontally-oriented data cartridges 14. Such an embodiment increases the storage density of the high-density media storage system 10, as will become readily apparent from an understanding of the following discussion of the invention.

Storage libraries 20 may also be provided with read/write device(s) 18. Read/write device 18 may be operated to perform read and/or write operations, enabling the user to access the data stored on the data cartridges 14. Read/write device 18 is also preferably configured to receive horizontally-oriented data cartridges 14. This configuration also enhances the ability of the drive head of read/write device 18 to properly align with the tape spindle of data cartridge 14 and reduces the occurrence of read/write failures.

It is noted that the high-density media storage system 10 is not limited to use with any particular read/write device(s) 16 or storage magazines 17. While the read/write device 16 may be a multi-capacity drive (i.e., configured to receive two or more data cartridges 18 therein), in other embodiments, read/write device 16 may be a single-capacity drive. Likewise, more than one read/write device 18 may be provided in storage library 20. Of course read/write devices 18 may not be provided in every storage library 20. Similarly, storage magazines 17 may have any suitable number of storage locations 16 for storing data cartridges 18.

Storage locations 16 and read/write device(s) 18 may be arranged in any suitable position in the high-density media storage system 10. According to one embodiment, storage locations 16 and read/write device 18 are arranged in the storage libraries 20 in a generally U-shaped configuration, as shown in FIG. 2. For example, storage magazines 17 are arranged on each side of the storage library 20 (e.g., in drawers), and the read/write device 18 may be provided at the far end of the storage library 20.

Although storage locations 16 and read/write device 18 are shown arranged in a particular manner in FIG. 2, other suitable configurations are also contemplated as being within the scope of the invention. In addition, the number and position of storage locations 16 and read/write devices 18 provided in the media storage system 10 may depend upon various design considerations. Such considerations may include, but are not limited to, the frequency with which data cartridges 14 are accessed, and the desired physical dimensions of the storage libraries 20 and media storage system 10.

High-density media storage system 10 may also be provided with various ancillary devices, such as power supplies, electronic controls, input/output (I/O) devices, and data processing systems, to name only a few. These ancillary devices are commonly associated with media storage systems 12, and therefore are not shown or described herein. According to one embodiment, such ancillary devices are provided in regions 30 in storage library 20.

The regions 30 are generally defined around the outer-perimeter by adjacent walls of the storage library 20, storage magazines 17, and read/write device 18, as shown in FIG. 2. Suitable clearance may be provided between region 30 and adjacent components, for example, to enable the drawers to open and close. In addition, a variable-width drive envelope 32 may also be provided adjacent regions 30 for the read/write device(s) 18. Preferably, variable-width drive envelope 32 defines an unobstructed region wherein read/write device(s) 18 of different sizes (e.g., different width) can be mounted. Accordingly, the media storage system 10 is suitable for use with various types and/or different manufacturer devices.

High-density media storage system 10 comprises a cartridge-handling apparatus 12 for transporting data cartridges 14. One embodiment of cartridge-handling apparatus 12 is shown and described with reference to FIG. 2 and FIG. 3. According to this embodiment, cartridge-handling apparatus 12 comprises a cartridge-engaging assembly or "picker" 34. Picker 34 is configured to engage, withdraw, and retain data cartridge 14 therein for transport in the media storage system 10, and then to eject the data cartridge 14 at an intended destination. The invention is not limited to use with any particular type or style of picker 34.

Picker 34 may be mounted to a carriage 36 in such a manner so as to engage the horizontally-oriented data cartridges 14. In one embodiment, picker 34 is mounted to a guide rail 38 provided on the carriage 36. In the embodiment shown, guide rail 38 defines a generally U-shaped displacement path for travel of the picker 34 adjacent storage locations 16 and read/write device 18. A suitable drive system may be provided for moving the picker 34 along guide rail 38 through a first displacement path at positions 48, 48', and 48".

More specifically, picker 34 may be mounted to the carriage 36 according to one embodiment of the invention as follows. A mounting bracket 40 provided on the picker engages guide rail 38. For example, mounting bracket 40 may slidingly engage the guide rail 38. Alternatively, picker may be mounted using a gear assembly, pin-in-track system, etc. Optionally, load-bearing member(s) 42 may also be mounted to the picker 34, and preferably roll or slide relative to the floor of the carriage 36.

The triangular configuration of mounting bracket and load-bearing members shown in FIG. 2 enables the picker 34 to be readily moved around the corners of the U-shaped guide rail 38 (e.g., illustrated at position 48"). However, other embodiments are also contemplated as being within the scope of the invention. In another embodiment, for example, more than one mounting bracket 40 may be provided on the picker 34 (e.g., to engage another guide rail mounted overhead). Likewise, any number of load-bearing members 42 may also be provided on the top and/or bottom of the picker 30.

Any suitable drive system may be provided for moving the picker 34 through the first displacement path. In one embodiment, drive system may comprise a drive motor mounted to the picker 34 and operatively associated with a drive pinion. The drive pinion may engage a gear rack that is substantially aligned with the guide rail 38. Operation of the drive motor causes the drive pinion to move relative to the gear rack and hence picker 34 to travel through the first displacement path. It is understood, however, that other drive systems can also be readily provided by one skilled in the art after having become familiar with the teachings of the invention.

In another embodiment, picker 34 may be mounted to a linear guide rail aligned substantially down the center of the storage library 20 between the storage magazines 17. The picker 34 may be translated along the length of the guide rail 38 and rotated at least 180 degrees about the guide rail 38 for positioning adjacent the storage magazines 17 on either side and the read/write device 18. See for example, co-owned U.S. Pat. No. 6,327,113 B1 (Dec. 4, 2001) for ROTATABLE CARTRIGE-ENGAGING ASSEMBLY of Mueller, et al.

Carriage 36 may be mounted in the high-density media storage system 10 according to one embodiment of the invention as follows. Bracket members 50 mounted to the carriage 36 slidingly engage guide posts 52 aligned along a second displacement path in the media storage system 10, as illustrated by arrows 54 in FIG. 1. Preferably the second displacement path extends between each of the storage libraries 20–24, thereby eliminating the need for pass-through mechanisms. A drive system 56 (FIG. 3) may be operated to effect travel of the carriage 36, and hence the picker 34, through the second displacement path.

Figure 3:
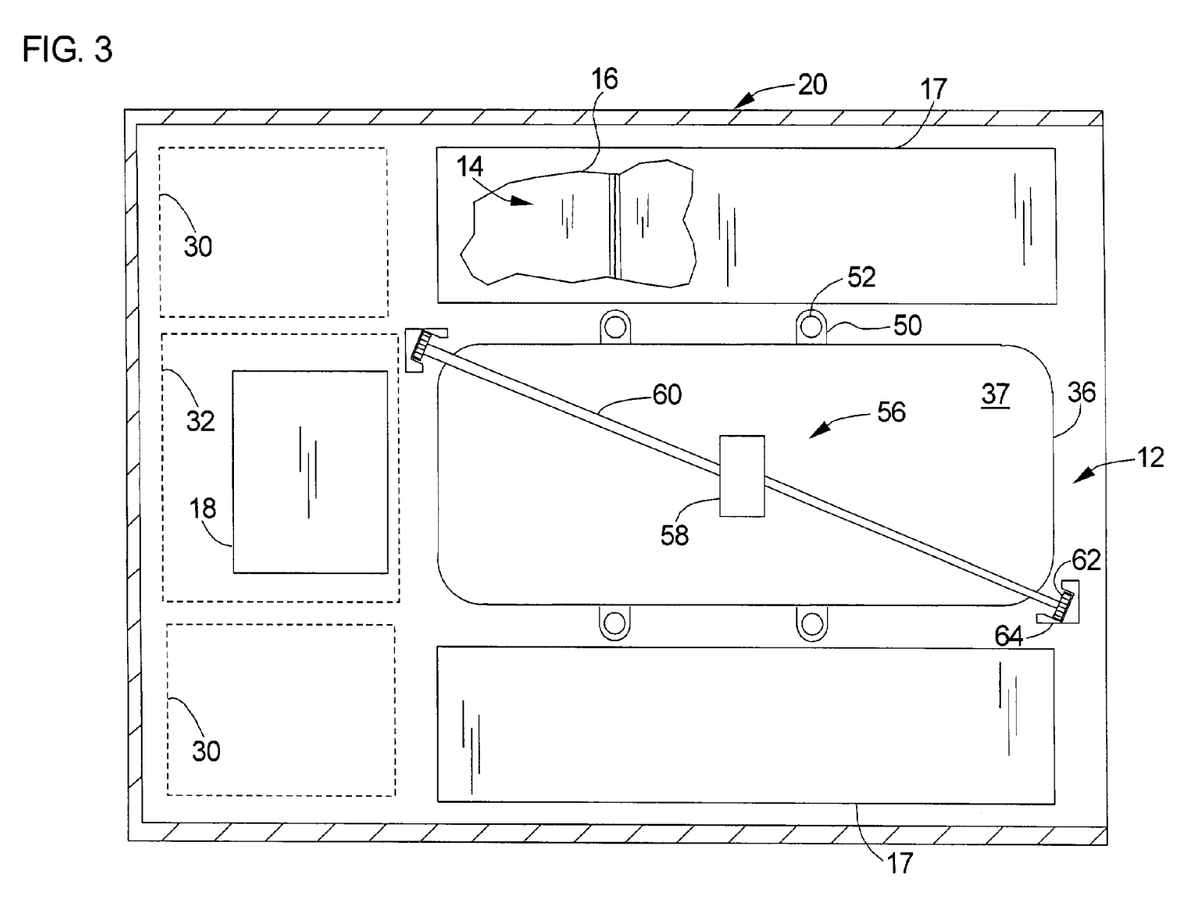
FIG. 3 is a plan view of one embodiment of a drive system.

One embodiment of a drive system 56 is shown in FIG. 3 as it may be used according to the teachings of the present invention. The drive system 56 comprises a drive motor 58 mounted to the carriage 36 (e.g., on lid 37). Drive motor 58 is operatively associated with a drive shaft 60 for rotating drive pinion 62. Drive pinion 62 engages a gear rack 64 mounted in the storage libraries 20. Operation of the drive motor 58 rotates the drive shaft 60, which in turn rotates drive pinion 62 along the gear rack 64, thereby moving carriage 36 through the second displacement path.

It is understood that other embodiments for mounting cartridge-handling apparatus 12 for translation in the media storage system 10 are also contemplated as being within the scope of the invention. For example, other suitable guides 52 are readily available (e.g., an "I-beam"). Other suitable drive systems are also available (e.g., a pulley system). For example, one pulley wheel may be mounted in the media-storage system 12 and another pulley wheel mounted to carriage 36. The two pulley wheels may be operatively associated with one another via a chain or belt. Other embodiments include, but are not limited to, other gear/rack configurations, other belt-driven configurations, screw-driven systems, etc. Such drive systems are well-understood by those skilled in the art and can be readily adapted for use with the present invention after having become familiar with the teachings of the invention.

Figure 4:
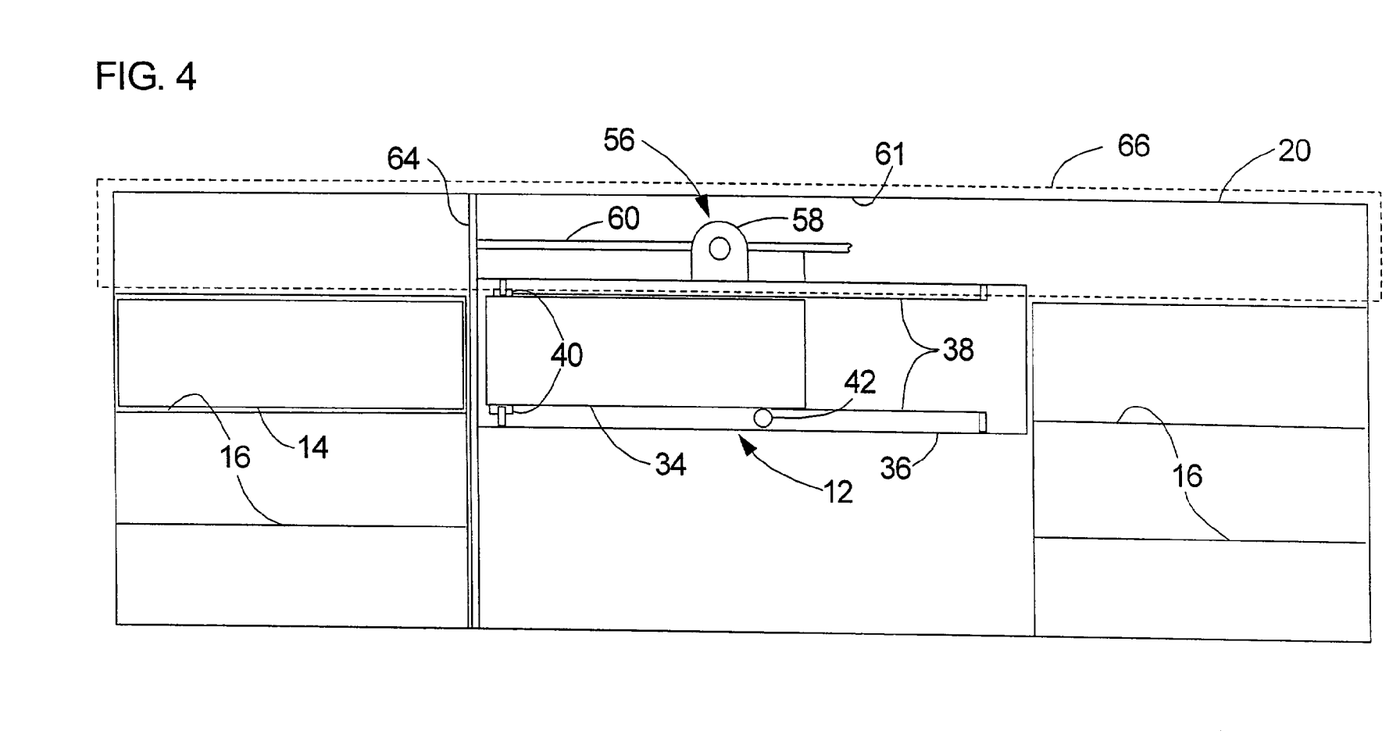
FIG. 4 is a simplified front view of one of the storage libraries illustrating an embodiment of an operational envelope.

Cartridge-handling apparatus 12, such as just described, employs operational space. For example, as can be seen in FIG. 4, when carriage 36 is moved to the top of the media storage system 10, clearance is provided between drive motor 58 and drive shaft 60, and the lid 61 of the storage library 24.

According to the teachings of the invention, high-density media storage system 10 is provided with an operational envelope 66. Operational envelope 66 accommodates drive system 56 in the media storage system 10, as illustrated in FIG. 4 and FIG. 5.

In addition, operational envelope 66 enables at least the shell of the storage libraries 20 to be manufactured the same as one another. As such, the media storage system 10 may be more cost-effectively manufactured. For example, the storage libraries 20 can be manufactured using the same equipment, and packaged, shipped and sold without having to maintain separate inventories.

Figure 5:
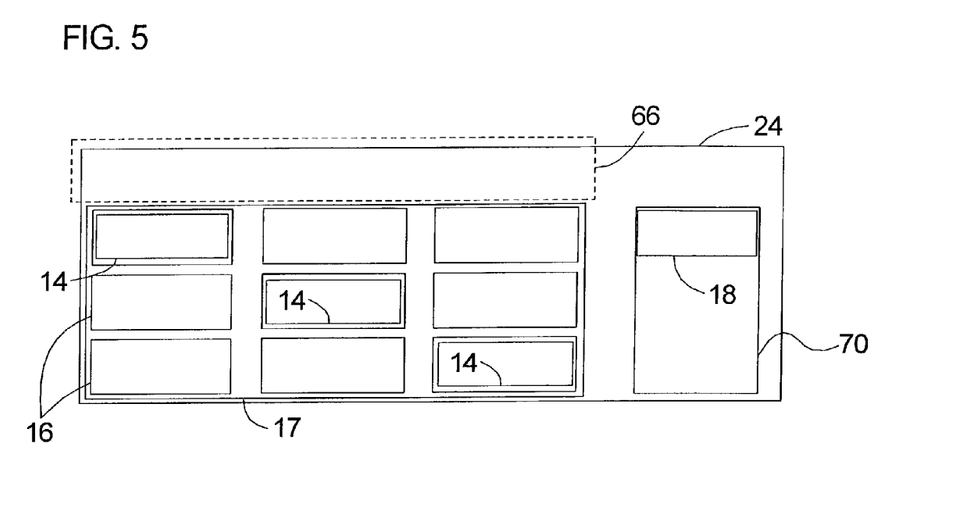
FIG. 5 is a simplified side view of the storage library in FIG. 4 illustrating the operational envelope.

One embodiment of operational envelope 66 is shown in FIG. 5 for use with one of the storage libraries 24. In this embodiment, operational envelope 66 is provided in the upper-most portion of the storage library 24. Operational envelope 66 is characterized in this embodiment as being void of any storage locations 16 for storing data cartridges 14. Storage locations 16 and read/write device(s) 18 are provided below the operational envelope 66. When the cartridge-handling apparatus 12 is positioned at the top of the media storage system 10, the drive system 56 is received in the operational envelope 66.

The operational envelope 66 need not be provided for each storage library 20–24 in the media storage system 10 according to the teachings of the invention. Indeed, it is preferable to only provide the operational envelope 66 for one of the storage libraries 24, thereby increasing the storage density (i.e., the number of storage locations 16 in a given size media storage system 10).

Figure 6:
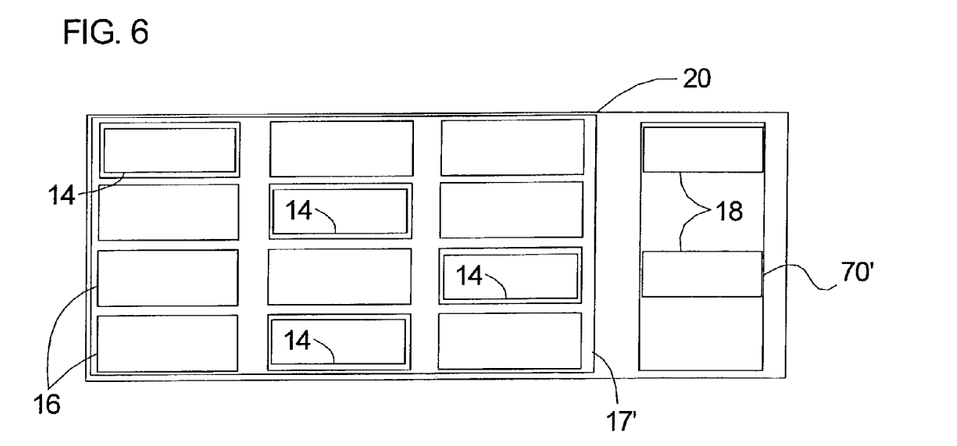
FIG. 6 through FIG. 11 are simplified side views illustrating other embodiments of operational envelopes.

Therefore, additional storage libraries 20–23 (e.g., stacker modules) for use with the same media storage system 10 may be configured with the storage locations 16 and read/write device(s) 18 filling the interior of each storage library 20, as shown in FIG. 6. Such an embodiment increases the storage density of the media storage system 10. Only the storage library 24 having the operational envelope 66 is burdened with the extra overhead, freeing space in the other storage libraries 20–23 for storing more data cartridges 14.

Storage magazines 17 may be used with the storage libraries 20 having operational envelope 66, and in the alternative, with stacker modules. One embodiment of storage magazine 17 (FIG. 5) may comprise fewer storage locations 16 and a void space, making it suitable for use with the storage library 24 having operational envelope 66. Another embodiment of storage magazine 17' (FIG. 6) may comprise storage locations 16 that fill the storage library 20 from top to bottom. Optionally, storage magazine 17' may comprise removable partitions that can be added or removed depending on whether the storage magazine 17' is to be used with the stacker module or the storage library 20 having operational envelope 66. Yet other embodiments are also contemplated as being within the scope of the invention.

Likewise, mounting hardware 70 for the read/write device(s) 18 may be used with the storage libraries 20 having operational envelope 66, and in the alternative, with stacker modules. One embodiment of mounting hardware 70 (FIG. 5) may extend only part way from the top to the bottom of the storage library 20, for use with storage libraries having operational envelope 66. Another embodiment of mounting hardware 70' (FIG. 6) may extend from the top to the bottom of the storage library 20 so that read/write device(s) 18 can be mounted at each level.

Of course it is understood that the invention is not limited to use with any particular configuration of storage magazine 17, 17' or mounting hardware 70, 70'. The use of particular storage magazines 17, 17' and mounting hardware 70, 70' may be based on cost and other design considerations.

Figure 7:
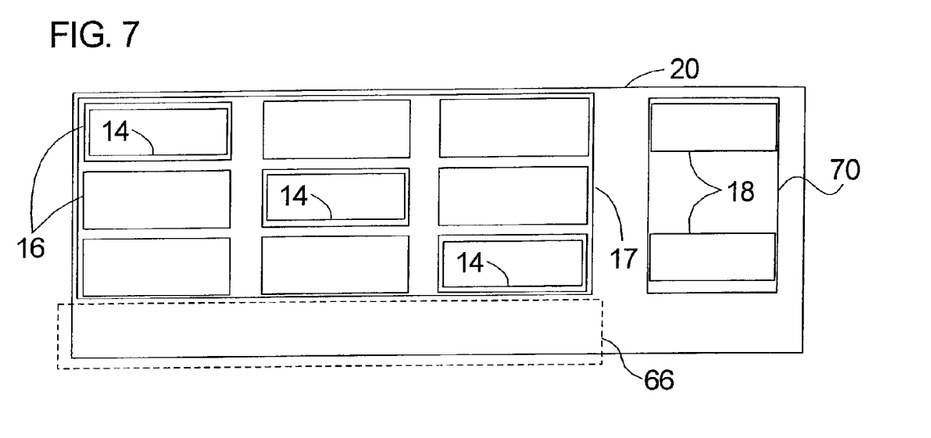

Another embodiment of the operational envelope 66 is shown in FIG. 7, wherein the operational envelope 66 is provided beneath the storage locations 16 and read/write device 18 in the bottom of storage library 20 (e.g., for use at the bottom of media storage system 10). Additional storage libraries 21–24 (e.g., stacker modules), such as those previously discussed with respect to FIG. 6, may be stacked on top of the storage library 20. Such an embodiment accommodates drive system 56 mounted to the bottom of carriage 36. When carriage 36 is moved to the bottom of the media storage system 10, drive system 56 is received in operational envelope 66 at the bottom of storage library 20.

Figure 8:
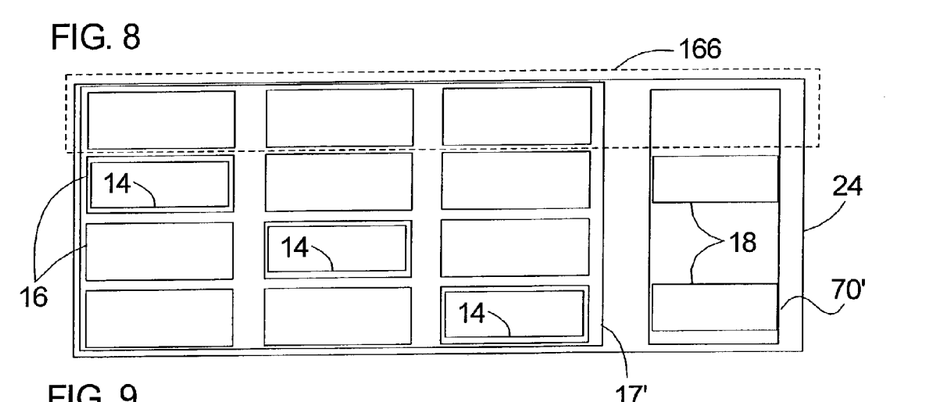
Figure 9:
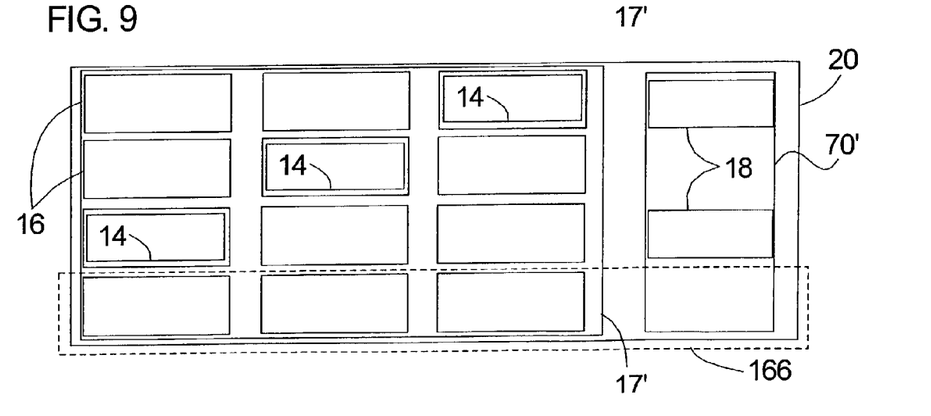

Yet other embodiments of the operational envelope 166 are shown in FIG. 8 and FIG. 9. According to these embodiments, storage locations 16 extend from the top to the bottom of the storage libraries 20. In use, however, the top row (FIG. 8) or bottom row (FIG. 9) of storage locations 16 are not used to store data cartridges 14 and instead are left empty for operational envelope 166. Preferably, read/write device(s) 18 are not provided at adjacent the top row (FIG. 8) or the bottom row (FIG. 9) of the storage library 24. According to such embodiments, each of the storage libraries 20–24 can be manufactured the same as one another and configured during use to accommodate the drive system 56 mounted either to the top or bottom of the carriage 36, as the case may be.

Figure 10:
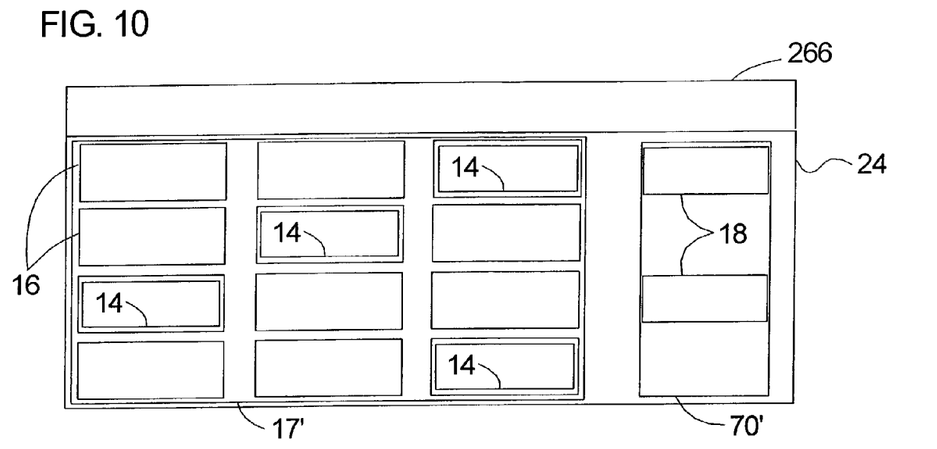
Figure 11:
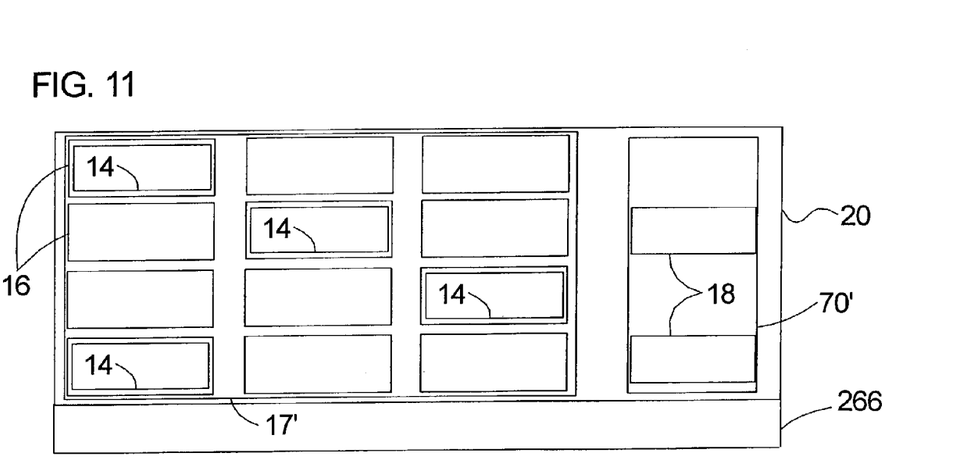

Yet other embodiments of operational envelope 266 are shown in FIG. 10 and FIG. 11. According to these embodiments, the operational envelope is an appendage 266. Appendage 266 may be mounted to the top or bottom of the storage libraries 20, based upon the arrangement of the drive system 56 on the carriage 36. When the cartridge-handling apparatus 12 is positioned at the top (or bottom, as the case may be) of media storage system 10, the drive system 56 is accommodated in the appendage 266. Such embodiments also enable each of the storage libraries 20 to be manufactured the same as one another regardless of whether it serves as a stacker module or one of the storage libraries 20 having the operational envelope 266. Also advantageously, appendage 266 can be added to the appropriate storage library by the end-user.

What is claimed is:

1. A high-density media storage system, comprising:
a plurality of storage libraries, each of said plurality of storage libraries configured to store data cartridges in a horizontal orientation in high-density relation to one another;
a cartridge-handling apparatus having a drive assembly, the drive assembly moving said cartridge-handling apparatus through a displacement path through said plurality of storage libraries; and
an operational envelope provided at one end of the displacement path in one of said plurality of storage libraries, said operational envelope being void of data cartridges, the operational envelope sized to receive said drive assembly of said cartridge-handling apparatus when said cartridge-handling apparatus is positioned at the one end of the displacement path,
the one of said plurality of storage libraries containing the operational envelope also storing at least one data cartridge.

2. The high-density media storage system of claim 1, wherein said plurality of storage libraries have at least one configurable storage magazine.

3. The high-density media storage system of claim 2, wherein said at least one configurable storage magazine has removable partitions.

4. The high-density media storage system of claim 1, wherein said cartridge-handling apparatus has a picker configured to engage the horizontally-oriented data cartridges.

5. The high-density media storage system of claim 4, wherein said picker has a mounting bracket substantially centered thereon, the mounting bracket slidingly engaging a guide rail.

6. The high-density media storage system of claim 5, wherein said picker has at least one load-bearing member.

7. The high-density media storage system of claim 4, wherein said plurality of storage libraries each have a variable-width drive envelope to receive read/write devices having different sizes.

8. The high-density media storage system of claim 1, wherein said plurality of storage libraries are sized to fit in an Electronics Industry Association (EIA) standard rack system.

9. The high-density media storage system of claim 1, wherein each of the plurality of storage libraries comprises a shell storing respective data cartridges, the shell of the one of said plurality of storage libraries containing the operational envelope and respective data cartridges.

10. The high-density media storage system of claim 9, wherein the shells of the storage libraries are configured to be the same as one another.

11. The high-density media storage system of claim 9, wherein the storage libraries are stacked in a vertical arrangement.

12. The high-density media storage system of claim 1, wherein the cartridge-handling apparatus comprises a picker movable to positions adjacent storage locations in the storage libraries to withdraw respective data cartridges.

13. A high-density media storage system, comprising:
a plurality of storage libraries arranged adjacent one another, each of said plurality of storage libraries configured to store data cartridges in a horizontal orientation;
a cartridge-handling apparatus having a picker and a drive assembly, the picker configured to engage the horizontally-oriented data cartridges, and the drive assembly moving the picker through a displacement path in said plurality of storage libraries; and
an operational envelope provided on only one of said plurality of storage libraries, said operational envelope receiving said drive assembly when the picker is positioned at one end of the displacement path.

14. The high-density media storage system of claim 13, wherein said operational envelope is provided on the bottom of one of said plurality of storage libraries.

15. The high-density media storage system of claim 13, wherein said operational envelope is provided on the top of one of said plurality of storage libraries.

16. The high-density media storage system of claim 13, wherein said operational envelope is an appendage to one of said plurality of storage libraries.

17. The high-density media storage system of claim 13, wherein each of said plurality of storage libraries has a plurality of storage locations arranged in high-density relation to one another.

18. The high-density media storage system of claim 13, wherein at least one of said plurality of storage libraries has at least twenty-four storage locations.

19. The high-density media storage system of claim 13, wherein at least one of said plurality of storage libraries has a variable-width drive envelope to receive read/write devices having different sizes.

20. The high-density media storage system of claim 13, wherein said plurality of storage libraries comprise at least one high-density stacker module.

21. The high-density media storage system of claim 13, wherein the one of said plurality of storage libraries containing the operational envelope also stores at least one data cartridge, the operational envelope being void of storage locations for storing data cartridges.

22. The high-density media storage system of claim 21, wherein each of the plurality of storage libraries comprises a shell storing respective data cartridges, the shell of the one of said plurality of storage libraries containing the operational envelope and respective data cartridges.

23. The high-density media storage system of claim 22, wherein the shells of the storage libraries are configured to be the same as one another.

24. The high-density media storage system of claim 22, wherein the storage libraries are stacked in a vertical arrangement.

25. The high-density media storage system of claim 13, wherein the picker is movable to positions adjacent storage locations in the storage libraries to withdraw respective data cartridges.

26. A method comprising:
providing a plurality of storage libraries each having a shell, the storage libraries storing respective data cartridges in a horizontal orientation;
moving a cartridge-handling apparatus along a displacement path through the storage libraries, the cartridge-handling apparatus for engaging data cartridges; and
positioning a drive assembly of the cartridge-handling apparatus in an envelope of a first one of the storage libraries in response to the cartridge-handling apparatus being positioned at one end of the displacement path, the envelope contained in the shell of the first storage library, the envelope void of any data cartridges, the shell of the first storage library also storing data cartridges.

* * * * *

UNITED STATES PATENT AND TRADEMARK OFFICE
CERTIFICATE OF CORRECTION

PATENT NO. : 6,956,715 B2
APPLICATION NO. : 10/389833
DATED : October 18, 2005
INVENTOR(S) : Robert L. Mueller et al.

It is certified that error appears in the above-identified patent and that said Letters Patent is hereby corrected as shown below:

On the title page, item (56), in column 2, under "U.S. Patent Documents", line 6,
below "6,621,655 B2 * 9/2003 White et al. ......360/92"
insert -- 2002/0167754 11/2002 Donkin et al. --.

Signed and Sealed this

Twenty-eighth Day of September, 2010

David J. Kappos
*Director of the United States Patent and Trademark Office*